United States Patent [19]

Morin

[11] Patent Number: 4,578,186
[45] Date of Patent: Mar. 25, 1986

[54] SWIMMING POOL FILTER SYSTEM

[76] Inventor: Thomas M. Morin, West Mountain Rd., Adams, Mass. 01220

[21] Appl. No.: 646,835

[22] Filed: Sep. 4, 1984

[51] Int. Cl.⁴ .................... B01D 35/02; B01D 35/14
[52] U.S. Cl. ..................... 210/90; 210/106; 210/169; 210/416.2; 137/558
[58] Field of Search ............. 210/169, 416.2, 85, 210/86, 106, 777, 90; 137/557, 558

[56] References Cited

U.S. PATENT DOCUMENTS

| | | | |
|---|---|---|---|
| 3,605,741 | 9/1971 | Spencer | 137/558 |
| 3,912,632 | 10/1975 | Winzen | 210/137 |
| 4,317,732 | 3/1982 | Shoquist | 210/777 |

OTHER PUBLICATIONS

"Owner's Guide" EC—65 System III PERFLEX Extended Cycle Filter and EC—65A Basic Filter Unit, 4 pages—Hayward Pool Products, Inc., Elizabeth, N.J.

Primary Examiner—Richard V. Fisher
Assistant Examiner—Sharon T. Cohen
Attorney, Agent, or Firm—Arthur K. Hooks

[57] ABSTRACT

A swimming pool filter system is comprised of a pump, a filter and a water conduit means for hydraulically connecting the pump and filter in a hydraulic loop with a swimming pool. The filter is a Hayward regenerable filter wherein the diatomaceous earth coating may be periodically shaken off the filter membrane to mix with the dirt and recoat the membrane several times between cleanings to extend the time between filter cleanings. A pressure sensitive switch, mounted at the filter inlet port, closes when the inlet pressure exceeds a predetermined magnitude to energize an alarm each time regeneration is needed or after five regenerations when cleaning will be required.

5 Claims, 4 Drawing Figures

SWIMMING POOL FILTER SYSTEM

BACKGROUND OF THE INVENTION

This invention relates to swimming pool filter systems and more particularly to such a system including an over-pressure alarm.

Conventional pool filter systems have a pump and a filter connected in a hydraulic loop with the pool.

The filter for large commercial pools is usually of the sand type wherein the water is pumped down through a bed of sand that collects the dirt from the water.

Smaller and less heavily used family pools, on the other hand, employ a low cost diatomaceous earth type filter wherein a finely woven membrane or the like that is water permeable separates the inlet chamber of the filter from the outlet water chamber, and the inlet side of the membrane is coated with diatomaceous earth which cannot pass through the membrance but collects dirt.

In either system employing a sand filter or a diatomaceous earth filter represented in FIG. 1 a pressure gauge 11 is normally installed at the inlet port of the filter 13 providing a pressure reading that increases as the filter collects more dirt and restricts the water flow through the filter 13. The supplier of the filter system normally recommends back washing the filter to remove the dirt when the pressure gauge indicates a high pressure of a predetermined value. Backwashing requires additional pipes and valves not shown here; for reversing the flow of water through the filter while flushing the dirt and diatomaceous earth to the outside.

In one diatomaceous earth filter, Model No. EC-65 System III made by Hayward Pool Products, Inc. of Elizabeth, N.J., removal of the dirt is not accomplished by back washing but rather by moving and shocking the membrane to redistribute the diatomaceous earth in the inlet chamber of the filter and, with the inlet and outlet ports shut closed, draining the inlet chamber. Such a cleaning and dirt removal operation is said to take about 5 minutes and should be done when the inlet port pressure gauge rises more than 10 psi (pounds per square inch) in less than a 24 hour period or when cloudy water returns to the pool for longer than 30 seconds after a "regeneration" step.

The frequency at which the filter must be cleaned by the above-noted cleaning/draining step in this system is substantially less than that for a more conventional diatomaceous earth filter system having only the capability of being backwashed because the Hayward filter can be regenerated, i.e. agitated, by shocking the movable filter membrane relative to the filter housing, each time the pressure rises to within 7 to 10 psi above the pressure read just after the last cleaning operation. During this simple regeneration, the clogged cake is shaken off of the membrane so that the dirt having coated the diatomaceous earth coating, and the diatomaceous earth itself, are redistributed, before resuming normal pumping and filtering and recoating the membrane with the more permeable redistributed mixture of dirt and diatomaceous earth.

Under normal operation this system typically should be regenerated every two or three days, while draining to clean the filter is needed only after 3 to 10 weeks by the above-noted criteria. However, these times vary greatly with pool usage and weather conditions.

In practice, a family pool filter system is only checked when some one of the family members happens to think about it, and the chances are especially great that both regeneration and draining to clean the filter will be done too infrequently. This is particularly true after hot summer days when algae, if any, grows faster and pool usage is generally high, both increasing the dirt load to be filtered and drastically increasing the frequency of regeneration that is needed. Furthermore, besides the deteriorating condition of the swimming pool water, the pump will run inefficiently and uselessly. And in those systems wherein chloride is automatically dispensed into the water conduits from the pump to the pool, the pool can turn green with algae within hours on a hot day of high usage when water flow is blocked by a clogged filter.

It is, therefore, an object of the present invention to provide in a diatomaceous-earth pool-filter system of the regeneration type, an alarm that is activated when regeneration and/or cleaning is needed.

It is a further object of this invention to provide such a pool filter system wherein the number of regenerations executed is automatically counted, so that the count from the time of the previous filter cleaning operation may be used as an indication of the need for the next filter cleaning operation.

SUMMARY OF THE INVENTION

A swimming pool filter system in comprised of a water pump, a water filter of the diatomaceous earth type, a water conduit means for hydraulically series connecting the pump and the filter in a hydraulic loop with a swimming pool and a pressure sensitive switch means. The switch means is hydraulically connected to the inlet port of the filter for actuating an alarm when the water pressure at near the filter inlet port exceeds a predetermined magnitude corresponding to a degree of accumulation of dirt in the filter that can substantially reduce the water flow rate through the filter.

Alternatively the pressure sensitive switch means is for producing a number of switch closures, one each time said pressure exceeds said predetermined magnitude, and the system additionally includes a resettable counter that counts and resets when the count reaches a predetermined number and actuates the alarm.

The filter system of this invention is particularly advantageous when the filter is a Hayward type filter, because of its capability for being regenerated several times in each operating period between cleanings. Each regeneration involves dropping the water flow rate to near zero and shaking the diatomaceous earth and accumulated dirt loose to mix homogenously in the filter inlet chamber. When the water flow is reestablished, the mixture recoats the porous filter membrane and the filter is generally operable again, on the average for a few days, before regeneration is required again. The filter tends to require more frequent attention after several regenerations, however, since the frequency of regenerations needed accelerates. Thus, unless one keeps track of the number of regenerations since the last cleaning and the time the last regeneration was executed, it is not possible to predict the next one. The alternative is to check the pressure gauge often which can be inconvenient and likely neglected.

The filter system of this invention entirely overcomes these problems by signaling the start of each regeneration and cleaning operation.

DESCRIPTION OF PREFERRED EMBODIMENTS

Figure 1:
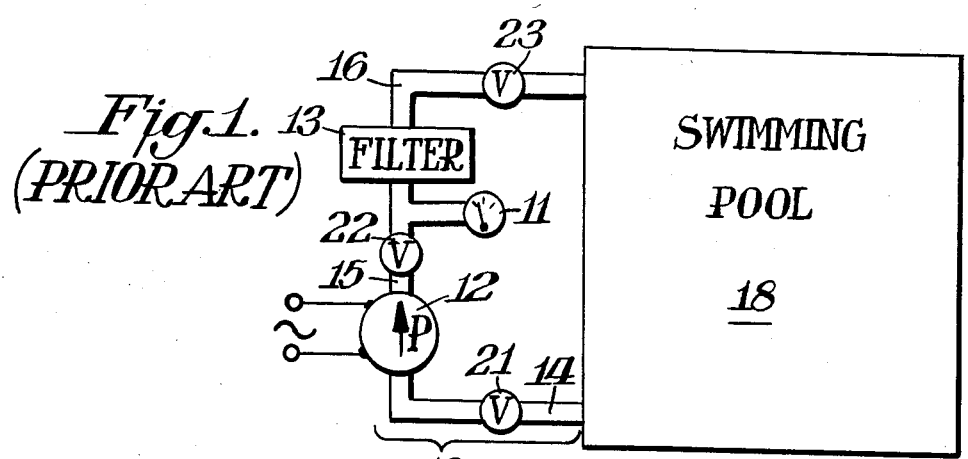
FIG. 1 shows a schematic diagram of a swimming pool serviced by a conventional swimming pool filter system.

The swimming pool filter system 10 of the prior art shown in FIG. 1, has an electric motor driven pump 12, a filter 13 and pipes 14, 15 and 16 connecting the pump 12 and filter 13 in a hydraulic loop with a swimming pool 18. Valves 21, 22 and 23 make it possible to hydraulically isolate either the filter 13 or pump 12 or both for purposes of maintenance and repair.

Figure 2:
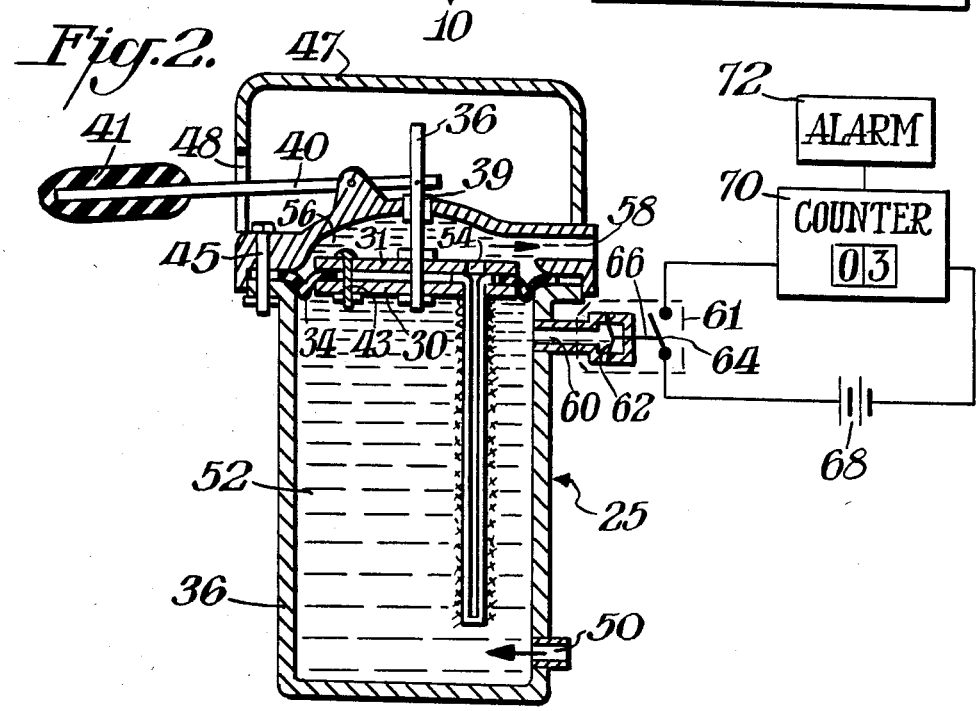
FIG. 2 shows in side sectional view a swimming-pool-filter of the regenerative diatomaceous earth type in combination with an alarm system shown in the form of a schematic diagram according to a preferred embodiment of this invention.
Figure 3:
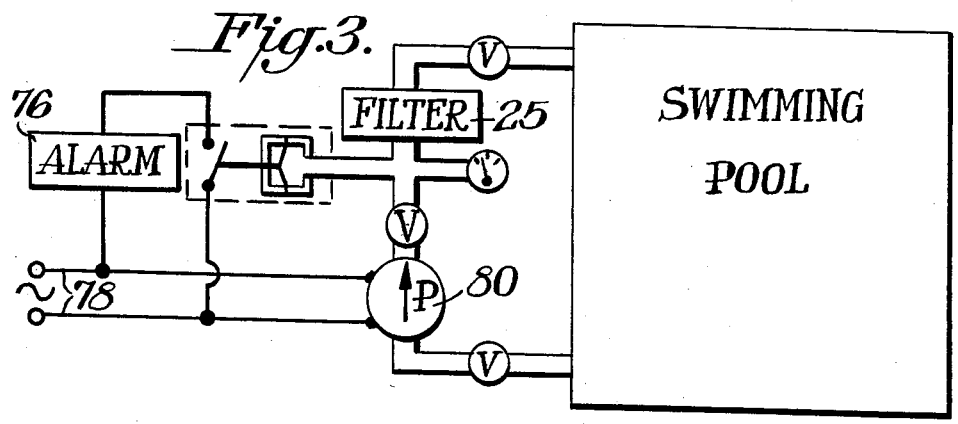
FIG. 3 shows a schematic diagram of a swimming pool served by a swimming-pool filter system according to another preferred embodiment of this invention.

Referring to FIG. 2, the construction of a Hayward type filter 25 is shown wherein the central feature is an elongated filter tube 27, that is typical of a plurality of tubes in this filter. The other tubes, not shown in FIG. 2, are of identical structure to tube 27. Tube 27 has a closed bottom and a flared open end like a laboratory test tube. The walls of tube 27 are permeable to water but not to diatomaceous earth, a coating 28 of which covers the outer walls of tube 27. The water permeable walls of the filter tube 27 may consist of a wire frame covered by a closely woven fabric of a synthetic fiber, such as NYLON.

The flared lips of the tubes 27 are clamped between two plates 30 and 31. Plates 30 and 31 also clamp between them at their peripheries an elastic washer 34 that with a bellows-like fold extends radially outward and is clamped between the top and bottom sections 35 and 36 of the filter housing, so that the filter tubes 27 and plates (30 and 31) assembly is movable in a vertical direction relative to the filter housing.

A rod 36 enters the housing top 37 through a water tight bushing 39 and is fastened to the plates 30 and 31. A bar 40 is hingedly connected to the rod 36 and to an upwardly extending pivot portion of the housing top 35 so that an operator may grasp the bar handle 41 and move it vertically to impart vertical movement to the filter tubes 27, A bolt and nut assembly or a rivet 43 is, among others (not shown), for holding the plates 30 and 31 together. A bolt and nut assembly 45, among others (not shown), holds the housing top 35 and housing bottom 36 together. A protective cap 47 is fitted over the housing top 35 and has a slot 48 through which bar 40 passes and is free to move vertically.

In operation, water from a swimming pool (not shown) is pumped through the filter inlet port 50 into the filter inlet chamber 52. The water in chamber 52 is forced through the diatomaceous earth coating 28 and further through the water permeable walls of tube 27. It then flows upward through the interior of tubes 27 and passes through hole(s) 54 provided therefor in plate 31. The water enters the filter outlet chamber 56 and exits through the filter outlet port 58.

Another port 60 is provided in the bottom housing member 36 hydraulically connecting the filter inlet chamber 52 with a pressure sensitive switch 61, illustrated here as having a flexible membrane 62, an electrical switch 64 and a mechanical linkage 66 therebetween. When the water pressure in the filter inlet chamber 52 rises to a critical level to which the pressure sensitive switch 61 has been adjusted, e.g., by changing the length of bar 66, then the electrical switch 64 is closed.

When switch 64 closes, the voltage from an electrical energy source, the battery 68, is impressed at the input of the electric impulse counter 70 of the automatic reset type. The counter 70 resets when it has accumulated a count representing the number of times switch 64 has closed (and/or opened) which count is the maximum to which counter 70 is adjusted or designed to count before automatically resetting. Upon resetting, counter 70 produces a signal at the input of alarm 72 that is a signal to an operator indicating a heavy accumulation of dirt within the filter 25 at which filtering and water flow rate even with another regeneration will be intolerably impaired, and thus at which cleaning of the filter should be initiated.

In a second preferred embodiment of this invention water filter 25 and the pressure sensitive switch 61 of FIG. 2 is connected to an alarm 76 whereby the alarm 76 is energized from the AC power mains 78 when the switch 64 closes. The pump 80 is energized from the same power mains 78.

The filter system of this second embodiment is suitable for providing a warning every time the pressure at the filter inlet port 60 exceeds the aforementioned predetermined value indicating the need for an operator to manually regenerate the filter 25.

Figure 4:
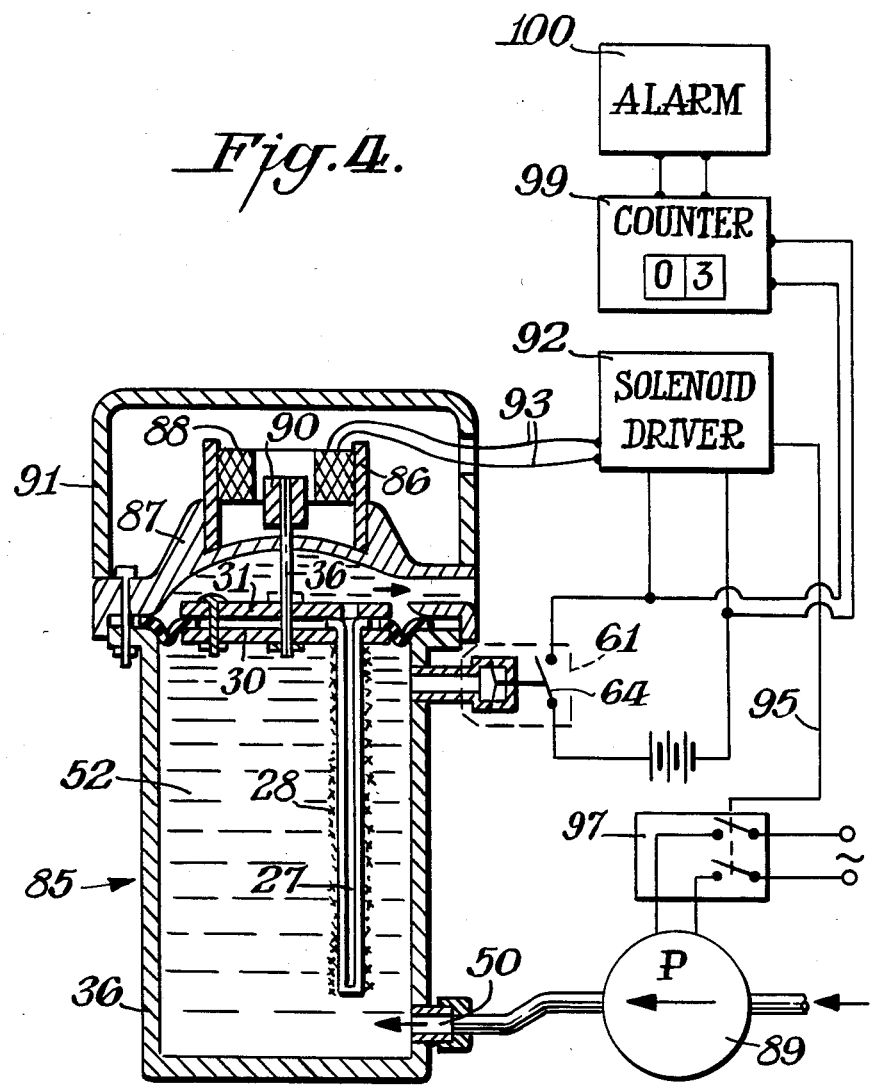
FIG. 4 shows in side sectional view a swimming-pool-filter of the regenerative diatomaceous earth type in combination with an automatic regeneration and alarm means according to a third preferred embodiment of this invention.

In a more fully automatic embodiment of this invention as depicted in FIG. 4, the filter 85 employs the housing bottom 36, the plate assembly including plates 30 and 31 and the filter tubes 27 that made up the major portion of filter 25 in FIG. 2. Also, the same pressure sensitive switch 61 is mounted in the housing bottom 36 as before.

However, the filter housing top 87 is modified to hold by a soft iron band 86 a solenoid 88, and the rod 36 has mounted on the upper end thereof an iron core 90 that is free to move with rod 36 and plates 30 and 31 relative to the solenoid and supporting housing top 87. A protective cap 91 is fitted over the top 87 and covers solenoid 88.

In this embodiment, regeneration of the filter is accomplished by shutting off the pump 89 and driving the solenoid 88 electrically to shake the diatomaceous earth 28 and accumulated dirt which will thereby be homogeneously dispersed and mixed in the still water inside the filter inlet chamber 52.

This is accomplished automatically each time that the pressure sensitive switch 64 responds to the aforementioned high pressure and actuates the solenoid driver 92 that for a period, preferably of about thirty seconds, applies a voltage to the solenoid 88 via wires 93. This driver voltage may be a 110V 60 Hz line voltage to vibrate the core 90 or may be a series of pulses to shock the core 90 which in either case effects the shaking loose of the diatomaceous earth 28 and dirt from the tubes 27. Simultaneously with the driving of the solenoid 88, the driver 92 effects the turning off of the pump 89. For this purpose the driver 92 may include an internal solenoid (not shown) linked mechanically via mechanical link 95 to open the line breaker 97.

A resulting counter 99 is connected as in the first embodiment to count the number of times that the pressure sensitive switch 64 has operated which corresponds to the number of times the filter 85 has been automatically regenerated. When the counter 99 resets, after counting up to the predetermined reset count number, the counter 99 actuates alarm 100 to indicate the need for cleaning the filter 85.

Experiments under a variety of weather and pool usage conditions show that when a pressure sensitive switch 64 is set to close and initiate regeneration every time the inlet chamber pressure of the filter reaches about 15 psi, enough dirt will have been accumulated in the filter to substantially reduce the flow rate and that periods between regenerations become short, usually less than a 24 hour day. Thus, the resettable counter should be reset at 5 for the particular system tested. Considering the effects upon the optimum reset count of small changes in filter capacity, pool size, pump size and the like, an optimum count reset number will fall between 4 and 9 for filter systems of this invention.

The alarms 72, 76 and 100 in the embodiments described here may be of any standard type. For example, a visual alarm may consist of a flashing lamp, or an acoustic alarm may employ a buzzer, horn or bell.

Also, the pressure sensitive switch 61 may be replaced by a linear pressure to voltage transducer (e.g. a transducer incorporating a stressed silicon diaphram or a diaphram with strain gauge) combined with an electronic threshold detector (e.g. of the standard Scmitt trigger type) wherein the threshold is adjusted to correspond to the aforementioned predetermined pressure.

What is claimed is:

1. A swimming pool filter system comprising:
   (a) a water pump;
   (b) a water filter of the diatomaceous earth type comprised of a housing, an inlet water chamber having means defining an inlet port and an outlet water chamber enclosed by said housing, and a movable water-permeable wall means separating said inlet and outlet chambers for supporting on the inlet chamber side of said wall a coating of diatomaceous earth and for moving, relative to said housing, in response to being mechanically energized to regenerate said filter;
   (c) a first water-conduit means for hydraulically series connecting said pump and said filter in a hydraulic loop with a swimming pool;
   (d) an electrically actuable alarm;
   (e) a pressure-actuated switch means hydraulically connected to said inlet port of said filter for closing or opening an electrical circuit each time the pressure at said filter inlet port rises to a predetermined value; and
   (f) a resettable counter means for counting the number of times said electrical circuit is closed or opened and thus the number of times said filter was regenerated, and for actuating said alarm when the count reaches a predetermined number of filter regenerations.

2. The filter system of claim 1 including means for resetting the counter means to zero.

3. The filter system of claim 1 wherein said counter means includes means for displaying said numbers.

4. The swimming pool filter system of claim 1 additionally comprising a mechanical energizing means for sharply moving said movable wall relative to said housing for a predetermined period of time in response to each said closing or opening of said circuit by said pressure activated switch means.

5. The swimming pool filter system of claim 4 wherein said mechanical energizing means is additionally for turning off said pump during said predetermined period.

* * * * *